United States Patent

Flosbach et al.

Patent Number: 6,013,326
Date of Patent: Jan. 11, 2000

[54] COATING COMPOSITIONS USE THEREOF AND PROCESS FOR THE PRODUCTION OF MULTI-LAYER LACQUER COATINGS

[75] Inventors: Carmen Flosbach; Friedrich Herrmann; Hermann Kerber, all of Wuppertal; Heinz-Walter Reifferscheidt, Bochum; Carmen Schloesser, Haan; Walter Schubert, Wuppertal, all of Germany

[73] Assignee: Herberts GmbH, Wuppertal, Germany

[21] Appl. No.: 09/000,427

[22] PCT Filed: Aug. 2, 1996

[86] PCT No.: PCT/EP96/03402

§ 371 Date: Apr. 17, 1998

§ 102(e) Date: Apr. 17, 1998

[87] PCT Pub. No.: WO97/06197

PCT Pub. Date: Feb. 20, 1997

[30] Foreign Application Priority Data

Aug. 8, 1995 [DE] Germany ............................ 195 29 124

[51] Int. Cl.$^7$ ................ B05D 1/36; B05D 3/02; C08F 8/30; C08F 8/32
[52] U.S. Cl. ............... 427/407.1; 427/409; 525/123; 525/124; 525/127; 525/162; 525/223; 525/329.9; 525/330.2; 525/330.5; 525/440
[58] Field of Search ................... 427/407.1, 409; 524/533, 537; 525/123, 127, 124, 162, 440, 443, 223, 329.9, 330.2, 330.5

[56] References Cited

U.S. PATENT DOCUMENTS

| | | | |
|---|---|---|---|
| 4,076,766 | 2/1978 | Simms | 428/458 |
| 4,565,730 | 1/1986 | Poth et al. | 427/407.1 |
| 5,098,956 | 3/1992 | Blasko | 525/123 |
| 5,275,847 | 1/1994 | Schwarte et al. | 427/407.1 |
| 5,290,633 | 3/1994 | Devlin et al. | 427/385.5 |
| 5,426,138 | 6/1995 | Bederke | 523/415 |
| 5,466,860 | 11/1995 | Flosbach | 560/43 |
| 5,574,103 | 11/1996 | Wu | 525/127 |
| 5,593,735 | 1/1997 | Wu | 427/461 |
| 5,753,756 | 5/1998 | Aerts et al. | 525/111.5 |

FOREIGN PATENT DOCUMENTS

| | | |
|---|---|---|
| 2 123 537 | 11/1994 | Canada . |
| 0 625 529 | 11/1994 | European Pat. Off. . |
| 0 653 468 | 5/1995 | European Pat. Off. . |
| WO 93/07195 | 4/1993 | WIPO . |

*Primary Examiner*—Diana Dudash
*Attorney, Agent, or Firm*—Pillsbury Madison & Sutro LLP

[57] ABSTRACT

Coating compositions suitable for stoved multi-layer coatings containing as binder:

A) 20 to 40 wt. % of hydroxy-functional (meth)acrylic copolymer obtainable from styrene and/or styrene derivatives; hydroxyethyl, hydroxypropyl and/or hydroxybutyl (meth)acrylate; non-functionalised (cyclo)alkyl (meth)acrylates having 8 to less than 18 C atoms in the (cyclo)alkyl residue; (meth)acrylic acid and optionally non-functionalised (cyclo)alkyl (meth)acrylates having up to 7 C atoms in the (cyclo)alkyl residue;

B) 20 to 40 wt. % of hydroxy-functional (meth)acrylic copolymer obtainable from hydroxyethyl, hydroxypropyl and/or hydroxybutyl (meth)acrylate; non-functionalised (cyclo)alkyl (meth)acrylates having 8 to less than 18 C atoms in the (cyclo)alkyl residue; non-functionalised (cyclo)alkyl (meth)acrylates having up to 7 C atoms in the (cyclo)alkyl residue and (meth)acrylic acid;

C) 0 to 40 wt. % of hydroxy-functional binders other than A) and B),

D) 10 to 50 wt. % of free or blocked polyisocyanates, and

E) 0 to 40 wt. % triazine-based components which crosslink with the hydroxyl groups of components A), B) and optionally C) to form ether and/or ester groups.

10 Claims, No Drawings

COATING COMPOSITIONS USE THEREOF AND PROCESS FOR THE PRODUCTION OF MULTI-LAYER LACQUER COATINGS

This application is national phase of international application PCT/EP96/03402 filed Aug. 2, 1996 which designated the U.S.

This invention relates to coating compositions which are in particular suitable for stoved multi-layer lacquer coatings, for example for automotive original lacquer coating, which are in particular distinguished by elevated acid resistance, elevated resistance to condensed water and excellent topcoat lacquer qualities.

EP-A-0 653 468 describes a coating composition which contains a combination of two different hydroxy-functional (meth)acrylic copolymers together with a crosslinking agent combination comprising a blocked polyisocyanate and an amino resin. Polyester resin may optionally be added to the (meth)acrylic copolymers as an additional binder.

The object of the invention is to provide coating compositions for stoved multi-layer coatings which are suitable for automotive original lacquer coating and which are distinguished by elevated acid resistance, excellent topcoat lacquer qualities and good resistance to exposure to condensed water.

It has been found that this object may be achieved by a coating composition which is provided by the present invention and contains as the binder:

A) 20 to 40 wt. % of one or more hydroxy-functional (meth)acrylic copolymers obtainable from
a1) 30 to 50 wt. % of styrene and/or one or more styrene derivatives
a2) 15 to 30 wt. % of hydroxyethyl, hydroxypropyl and/or hydroxybutyl (meth)acrylate
a3) 15 to 40 wt. % of one or more non-functionalised (cyclo)alkyl (meth)acrylates having 8 to less than 18 C atoms in the (cyclo)alkyl residue
a4) 2 to 4 wt. % of (meth)acrylic acid
a5) 0 to 30 wt. % of one or more non-functionalised (cyclo)alkyl (meth)acrylates having up to 7 C atoms in the (cyclo)alkyl residue
B) 20 to 40 wt. % of one of more hydroxy-functional (meth)acrylic copolymers obtainable from
b1) 25 to 50 wt. % of hydroxyethyl, hydroxypropyl and/or hydroxybutyl (meth)acrylate
b2) 20 to 40 wt. % of one or more non-functionalised (cyclo)alkyl (meth)acrylates having 8 to less than 18 C atoms in the (cyclo)alkyl residue
b3) 20 to 40 wt. % of one or more non-functionalised (cyclo)alkyl (meth)acrylates having up to 7 C atoms in the (cyclo)alkyl residue
b4) 0.3 to 2 wt. % of (meth)acrylic acid
C) 0 to 40 wt. % of one or more hydroxy-functional binders other than A) and B),
D) 10 to 50 wt. % of one or more free or blocked polyisocyanates,
E) 0 to 40 wt. % of one or more triazine-based components which crosslink with the hydroxyl groups of components A), B) and optionally C) to form ether and/or ester groups,
wherein the sums of components A) to E), a1) to a5) and b1) to b4) in each case amount to 100 wt. %.

The (meth)acrylic copolymers present in the coating compositions according to the invention may be produced by free-radical copolymerisation using conventional processes. The solution polymerisation process is preferred for synthesis of the (meth)acrylic copolymers (components A and B) used in the coating composition according to the invention. In this process, the solvent is introduced into the reaction vessel, heated to boiling temperature and the monomer/initiator mixture continuously apportioned within a certain time.

The term "(meth)acrylic" used in the present description and patent claims is synonymous with "acrylic and/or methacrylic". The term "(cyclo)alkyl" denotes "cycloalkyl and/or alkyl".

Polymerisation is preferably performed at elevated temperature, for example at temperatures of between 80° C. and 180° C., preferably at 100° C. to 150° C.

The polymerisation reaction may be initiated with conventional free-radical initiators. Examples of free-radical initiators are those based on peroxides, for example dialkyl peroxides such as di-tert.-butyl peroxide, dicumyl peroxide; diacyl peroxides, such as dibenzoyl peroxide, dilauroyl peroxide; hydroperoxides, such as cumene hydroperoxide, tert.-butyl hydroperoxide; peresters, such as tert.-butyl perbenzoate, tert.-butyl perpivalate, tert.-butyl per-3,5,5-trimethylhexanoate, tert.-butyl per-2-ethylhexanoate; peroxydicarbonates, such as di-2-ethylhexyl peroxydicarbonate, dicyclohexyl peroxydicarbonate; perketals, such as 1,1-bis-(tert.-butylperoxy)-3,5,5-trimethylcyclohexane, 1,1-bis-(tert.-butylperoxy)cyclohexane; ketone peroxides, such as cyclohexanone peroxide, methyl isobutyl ketone peroxide and azo compounds, such as 2,2'-azobis(2,4-dimethylvalero-nitrile), 2,2'azobis(2-methylbutyronitrile), 1,11-azobiscyclohexanecarbonitrile, azobisisobutyronitrile; together with C—C cleaving initiators, such as for example benzopinacole derivatives.

The polymerisation initiators are generally used, for example, in a quantity of 0.1 to 4 wt. %, relative to the initial weight of monomers. During polymerisation, the monomers may also be apportioned separately or at different times. The monomers or monomer mixture used may contain the free-radical initiators or the free-radical initiators may be added to the monomer mixture optionally at a slightly different time or be apportioned separately.

Suitable organic solvents which may conveniently be used in solution polymerisation are conventional lacquer solvents, as may subsequently also be used in the coating composition according to the invention, for example: ethylene glycol ethers, such as ethylene glycol monobutyl ether, diethylene glycol monobutyl ether, dipropylene glycol dimethyl ether, dipropylene glycol monomethyl ether, ethylene glycol dimethyl ether; ethylene glycol ether esters, such as ethylene glycol monoethyl ether acetate, ethylene glycol monobutyl ether acetate, 3-methoxy-n-butyl acetate, diethylene glycol monobutyl ether acetate, methoxypropyl acetate; esters, such as butyl acetate, isobutyl acetate, amyl acetate; ketones, such as methyl ethyl ketone, methyl isobutyl ketone, diisobutyl ketone, cyclohexanone, isophorone; alcohols, such as methanol, ethanol, propanol, butanol, aromatic hydrocarbons, such as xylene, Solvesso 100 (registered trademark for a mixture of aromatic hydrocarbons having a boiling range of 155 to 185° C.). Aliphatic hydrocarbons may also be used blended with the above-stated solvents.

Chain-transfer agents may also be used to control molecular weight. Examples are conventional chain-transfer agents, such as mercaptans, thioglycolic acid esters, chlorinated hydrocarbons, cumene, dimeric α-methylstyrene.

Polymerisation conditions (reaction temperature, feed time of the monomer mixture, solution concentration) are preferably arranged such that the (meth)acrylic copolymer A) has a weight average molecular weight (Mw) of between 5000 and 20000 and the (meth)acrylic copolymer B) has a weight average molecular weight (Mw) of between 2000 and 5000, in each case determined by gel permeation chromatography using polystyrene as the standard.

The (meth)acrylic copolymers A) containing hydroxyl groups are preferably within a glass transition temperature range of between +30 and +60° C., while the (meth)acrylic copolymers B) containing hydroxyl groups preferably have a glass transition temperature range of between −20 and +40° C., in each case calculated from the glass transition temperature stated in the literature for the homopolymers of the individual monomers (for example using the FOX equation, c.f. for example *Polymere Werkstoffe*, Batzer, 1985, page 307).

The (meth)acrylic copolymer A) preferably has an OH value of 80 to 120 mg of KOH/g and an acid value of preferably 15 to 30 mm of KOH/g, while (meth)acrylic copolymer B), which contains no styrene or styrene derivatives, preferably has an OH value of 120 to 180 mg of KOH/g and preferably an acid value of 3 to 15 mg of KOH/g.

Component a1) monomers used for the production of the hydroxy-functional (meth)acrylic copolymers A) are, for example, styrene and/or styrene derivatives, for example vinyltoluene, p-methylstyrene and p-tert.-butylstyrene.

Preferred monomers a2) for the production of the hydroxy-functional (meth)acrylic copolymers A) are hydroxyethyl, hydroxypropyl or hydroxybutyl methacrylate. Particularly preferred monomers are those having primary hydroxyl groups, such as 3-hydroxypropyl or 4-hydroxybutyl methacrylate.

Examples of monomers a3) for the production of the hydroxy-functional (meth)acrylic copolymers A) are ethylhexyl (meth)acrylate, trimethylcyclohexyl (meth)acrylate, lauryl (meth)acrylate, stearyl (meth)acrylate, isobornyl (meth)acrylate, octyl (meth)acrylate, 3,5,5-trimethylhexyl (meth)acrylate, nonyl (meth)acrylate, decyl (meth)acrylate, dodecyl (meth)acrylate, hexadecyl (meth)acrylate, octadecyl (meth)acrylate, 4-tert.-butylcyclohexyl (meth)acrylate. The methacrylic compounds are preferred here.

The preferred monomer a4) is acrylic acid.

Examples of monomers a5) for the production of the hydroxy-functional (meth)acrylic copolymers A) are methyl (meth)acrylate, ethyl (meth)acrylate, isopropyl (meth) acrylate, n-butyl (meth)acrylate, isobutyl (meth)acrylate, tert.-butyl (meth)acrylate, cyclohexyl (meth)acrylate. The methacrylic compounds are preferred here.

Preferred monomers b1) for the production of the hydroxy-functional (meth)acrylic copolymers B) are hydroxyethyl, hydroxypropyl or hydroxybutyl methacrylate. Particularly preferred monomers are those having secondary hydroxyl groups, such as 2-hydroxypropyl or 2- or 3-hydroxybutyl methacrylate.

Examples of monomers b2) for the production of the hydroxy-functional (meth)acrylic copolymers B) are ethylhexyl (meth)acrylate, trimethylcyclohexyl (meth)acrylate, lauryl (meth)acrylate, stearyl (meth)acrylate, isobornyl (meth)acrylate, octyl (meth)acrylate, 3,5,5-trimethylhexyl (meth)acrylate, nonyl (meth)acrylate, decyl (meth)acrylate, dodecyl (meth)acrylate, hexadecyl (meth)acrylate, octadecyl (meth)acrylate, 4-tert.-butylcyclohexyl (meth)acrylate. The methacrylic compounds are preferred here.

Examples of monomers b3) for the production of the hydroxy-functional (meth)acrylic copolymers B) are methyl (meth)acrylate, ethyl (meth)acrylate, isopropyl (meth) acrylate, n-butyl (meth)acrylate, isobutyl (meth)acrylate, tert.-butyl (meth)acrylate, cyclohexyl (meth)acrylate. The methacrylic compounds are preferred here.

The preferred monomer b4) is acrylic acid.

The proportion of methacrylic monomers within the (meth)acrylic copolymers A) and B) is preferably above 50 wt. % in each case, relative to the sum of monomers a2) to a5) or b1) to b4).

The hydroxy-functional (meth)acrylic copolymers A) and B) may be "chain-extended" with a lactone. The lactones (cyclic esters) attach themselves to hydroxyl and/or carboxyl groups, wherein the lactone ring is opened and a new terminal hydroxyl or carboxyl group is obtained. One example of a particularly suitable lactone is ε-caprolactone. The reaction with the lactone may, for example, proceed immediately after resin synthesis, i.e. immediately after synthesis of the (meth)acrylic copolymer A) and/or B). The reaction proceeds, for example, at elevated temperature, for example at temperatures of up to 100° C. The reaction may be performed, for example, with stirring for, for example, up to 10 hours.

The coating compositions according to the invention may contain as component C) one or more hydroxy-functional binders other than A) and B), for example (meth)acrylic copolymer resins other than A) and 9), polyester resins or also polyurethane resins. The coating compositions according to the invention preferably contain no further binders in addition to A) and B).

The coating compositions according to the invention contain one or more free or blocked polyisocyanates as component D). If blocked polyisocyanates are present, the coating compositions according to the invention are one-component (one-pack) coating compositions. If free polyisocyanates are present, they are formulated as two-component (two-pack) systems.

Examples of polyisocyanates which may be used in free or blocked form as component D) in the coating compositions according to the invention are cycloaliphatic, aliphatic and/or aromatic polyisocyanates, such as 1,2-propylene diisocyanate, 2,3-butylene diisocyanate, tetramethylene diisocyanate, 1,6-hexamethylene diisocyanate, 2,2,4-trimethylene diisocyanate, 1,12-dodecane diisocyanate, 1,3- and 1,4-cyclohexane diisocyanate, 1-isocyanato-3,3,5-trimethyl-5-isocyanatomethylcyclohexane (=isophorone diisocyanate, IPDI), perhydro-2,4'- and/or -4,4'-diphenylmethane diisocyanate, 1,3- and 1,4-phenylene diisocyanate, 2,4- and 2,6-tolylene diisocyanate, 2,4'- and/or 4,4'-diphenylmethane diisocyanate, 3,2'- and/or 3,4-diisocyanato-4-methyldiphenylmethane, 1,5-naphthylene diisocyanate, m-xylylene diisocyanate, p-xylylene diisocyanate, 4,4'-triphenylmethane triisocyanate, tetramethylxylylene diisocyanate or mixtures of these compounds.

In addition to these simple isocyanates, those containing heteroatoms in the isocyanate group linking residue are also suitable. Examples of these are polyisocyanates containing carbodiimide groups, allophanate groups, isocyanurate groups, uretdione groups, urethane groups, acylated urea groups and biuret groups.

Known polyisocyanates which are principally used in the production of lacquers are particularly suitable for the invention, for example modification products of the above-stated simple polyisocyanates containing biuret, isocyanurate or urethane groups, in particular tris-(6-isocyanatohexyl)biuret, the isocyanurate derived from isophorone diisocyanate or hexane diisocyanate or low molecular weight polyisocyanates containing urethane groups, as may be obtained by reacting excess diisocyanate with simple monohydric alcohols of the molecular weight range from 62 to 300, in particular with trimethylol-propane. Any desired mixtures of the stated polyisocyanates may, of course, also be used for the production of the products according to the invention.

Suitable polyisocyanates are moreover known prepolymers having terminal isocyanate groups, as are in particular obtainable by reacting the above-stated simple polyisocyanates, especially diisocyanates, with substoichiometric quantities of organic compounds having at least two groups capable of reacting with isocyanate groups. The compounds used are preferably those having a total of at least two amino groups and/or hydroxyl groups and a number average molecular weight of 300 to 10000, preferably of 400 to 6000. The corresponding polyhydroxyl compounds are preferably used, for example the hydroxy polyesters, hydroxy polyethers and/or acrylate resins containing hydroxyl groups known in polyurethane chemistry. In these known prepolymers, the ratio of isocyanate groups to isocyanate reactive hydrogen atoms is 1.05 to 10:1, preferably 1.1 to 3:1, wherein the hydrogen atoms preferably originate from hydroxyl groups. The nature and quantity ratios of the starting materials used in the production of the NCO prepolymers are moreover preferably selected such that the NCO prepolymers have an average NCO functionality of 2 to 4, preferably of 2 to 3 and a number average molecular weight of 500 to 10000, preferably of 800 to 4000.

It is also possible to use copolymers of isocyanate-functional, unsaturated monomers, such as for example the vinylically unsaturated monoisocyanate dimethyl-m-isopropenylbenzyl isocyanate, as the polyisocyanate, as is described inter alia in DE-A-41 37 615.

If component D) comprises blocked polyisocyanates, conventional blocking agents may be used, such as conventional CH-acidic, NH-, SH- or OH-functional compounds which make crosslinking possible under curing conditions. Examples are CH-acidic compounds such as acetyl acetone or CH-acidic esters, such as for example acetoacetic acid alkyl esters, malonic acid dialkyl esters, aliphatic or cycloaliphatic alcohols, such as n-butanol, isopropanol, tert.-butanol, furfurol, 2-ethylhexanol, cyclohexanol; phenols, such as cresol, tert.-butylphenol, dialkylamino alcohols, such as dimethylaminoethanol, oximes, such as methyl ethyl ketoxime, acetone oxime, cyclohexanone oxime, acetophenone oxime, lactams such as E-caprolactam or 2-pyrrolidone, imides such as phthalimide or N-hydroxy-maleinimide, hydroxyalkyl esters, hydroxamic acids and the esters thereof, N-alkylamides such as methylacetamide, imidazoles such as 2-methylimidazole, pyrazoles such as 2,3-dimethylpyrazole. Mixtures of these blocking agents may, however, also be used.

For the purposes of the present invention, CH-acidic esters and/or oximes are preferred blocking agents for the polyisocyanates, with CH-acidic esters being particularly preferred. The alkyl groups of the esters, which may be identical or different in malonic acid dialkyl esters or acetoacetic acid esters, preferably have 1 to 5 carbon atoms. Examples of malonic acid dialkyl esters are $C_1$–$C_5$ alkyl esters, such as for example malonic acid dimethyl, diethyl, diisopropyl, dibutyl, di-tert.-butyl and dipentyl ester. Malonic acid diethyl ester is particularly preferred. Examples of acetoacetic acid alkyl esters are $C_1$–$C_5$ alkyl esters such as acetoacetic acid methyl, ethyl, isopropyl, butyl, tert.-butyl and pentyl ester. Acetoacetic acid ethyl ester is particularly preferred. Examples of preferred oximes are acetone oxime and butanone oxime. It is also possible to use mixtures of these blocking agents.

The molar ratio of the blocking agents containing acidic hydrogen to the NCO groups of the isocyanates, for example the ratio of the malonic acid dialkyl esters and/or acetoacetic acid alkyl esters to NCO groups, may be varied, for example, from 0.5:1 to 1.5:1. In the event of an NCO excess, the free NCO groups may optionally be reacted with other reactants.

The blocking reaction with CH-acidic compounds may preferably be catalysed. The catalysts used to block the polyisocyanates are preferably alkali hydroxides, for example alkali metal hydroxides, such as lithium, sodium and/or potassium hydroxide. The alkali metal hydroxides are preferably used in anhydrous form. Lithium hydroxide is particularly preferably used. The catalysts are used in small quantities, for example in quantities of 0.1 to 2 wt. %, preferably of 0.3 to 1 wt. %, relative to the weight of isocyanate and CH-acidic blocking agent. The catalysts are used in solid form, for example powdered, and, once the blocking reaction is complete, are removed mechanically from the reaction mixture, for example by filtration.

Protective groups of more than one type, preferably those having different reactivities, may be used for blocking. It is thus, for example, possible to use a mixture of two or more differently blocked polyisocyanates D) or to use a polyisocyanate which, within each molecule, is blocked with two or more different protective groups.

If component D) comprises blocked polyisocyanates, the coating compositions according to the invention accordingly preferably contain one or more triazine-based components E) which crosslink with the hydroxyl groups of components A), B) and optionally C) to form ether and/or ester groups.

The triazine-based components E) which crosslink with the hydroxyl groups of components A), B) and optionally C) to form ether groups are, for example, preferably melamine resins conventional as crosslinking agents, such as for example methyl-etherified melamine resins, such as the commercial products Cymel 325, Cymel 327, Cymel 350 and Cymel 370, Maprenal MF 927. Further examples of usable melamine resins are butanol- or isobutanol-etherified melamine resins, such as for example the commercial products Setamin US 138 or Maprenal MF 610; co-etherified melamine resins, which are etherified with both butanol and methanol, such as for example Cymel 254, and hexamethoxy-methylmelamine (HMMM), such as for example Cymel 301 or Cymel 303, wherein the latter may require an external acid catalyst, such as for example p-toluenesulphonic acid, for crosslinking. Such acid catalysts may optionally be ionically or nonionically blocked with amines or epoxides.

The triazine-based components E) which crosslink with the hydroxyl groups of components A), B) and optionally C) to form ester groups are transesterification crosslinking agents, such as for example preferably tris(alkoxycarbonyl-amino)triazine, the suitability of which as a crosslinking agent for hydroxy-functional binders is known, for example, from EP-A-0 604 922.

The coating compositions according to the invention may be formulated in the conventional manner, i.e. with conventional commercial organic solvents, or as aqueous compositions. Solvents for conventional formulation are, for example, the solvents which were stated above for the production of the component A) and B) (meth)acrylic copolymers by solution polymerisation.

The coating compositions containing the binders to be used according to the invention may, in addition to the above-stated solvents and/or water, also contain conventional lacquer auxiliary substances, for example levelling agents, for example based on (meth)acrylic homopolymers, silicone oils, plasticisers such as phosphoric, phthalic or citric acid esters, Theological additives, such as pyrogenic silicon dioxide, microgels, reaction products containing urea groups of primary amines and polyisocyanates ("sagging control agents"), hydrogenated castor oil, curing accelerators, such as for example phosphoric acid, phosphoric acid esters, dicarboxylic acid semi-esters, citric acid; organic metal salts, such as dibutyltin dilaurate, zinc naphthenate, bismuth tricarboxylate, together with compounds containing tertiary amino groups, such as triethylamine and light stabilisers.

As mentioned, the coating compositions according to the invention may also be in water-borne form. If an aqueous emulsion is to be prepared, the solvent used in the production of the binder containing components A) and B) is largely removed. This may be achieved by distillation, optionally under a vacuum. The resultant binder concentrate containing components A) and B), which has an elevated solids content of, for example, 90 wt. %, may then, if acidic groups are present in a sufficient quantity, be neutralised with a conventional base, for example ammonia or an organic amine, for example, triethylamine. The neutralised binder containing A) and B), optionally after addition of crosslinking agent D) and optionally E), may then be emulsified in water. This may be achieved, for example, by vigorous stirring and, if necessary, heating, for example to temperatures of 30 to 80° C., for example 50° C.

Alternatively, the binder containing A) and B) may be emulsified with the assistance of a conventional, nonionic emulsifier. This is achieved, for example, by homogenising the binder concentrate, optionally together with the crosslinking agents D) and optionally E), and one or more nonionic emulsifiers, optionally with heating, for example to temperatures of 30 to 80° C., for example 60° C. Such a mixture may be emulsified in a conventional homogenising apparatus. Examples of these are rotor/stator homogenisers which operate at rotational speeds of, for example, 8000 to 10000 revolutions per minute. The emulsifiers are used, for example, in quantities of 3 to 30 wt. %, relative to the binder concentrate. Water-insoluble components of the coating compositions, such as for example lacquer additives such as light stabilisers or levelling auxiliaries, for example based on silicone oils, may be mixed into the binder concentrate before conversion into the aqueous phase and emulsified together.

The coating compositions according to the invention are particularly suitable for the production of a transparent topcoat (clear lacquer layer) in the production of stoved multi-layer coatings. The topcoat may, for example, be applied wet-on-wet onto a previously applied base lacquer layer, whereupon both layers are cured together. This invention accordingly also relates to the process for the production of multi-layer coatings or to the use of the coating compositions for the production thereof. The preferably non-aqueous coating compositions according to the invention may here be applied as transparent topcoat lacquers onto layers of aqueous or solvent-borne base lacquers for curable multi-layer coatings.

Pigmented coating compositions may also be prepared. Conventional organic and/or inorganic coloured pigments and/or extenders, such as titanium dioxide, micronised titanium dioxide, iron oxide pigments, carbon black, silicon dioxide, barium sulphate, micronised mica, talcum, azo pigments, phthalocyanine pigments, quinacridone or pyrrolopyrrole pigments may be used for this purpose.

The coating compositions according to the invention are applied using known methods, such as for example spraying, dipping, roller or knife application. In the case of use as a topcoat lacquer, it is applied onto the substrate which has optionally already been provided with further lacquer layers. The coating compositions according to the invention may also be applied by spraying using supercritical carbon dioxide as the solvent. In this case, the organic solvent content may be greatly reduced. After a flashing off phase, the applied coating composition is crosslinked, preferably by heating. Stoving temperatures are preferably between 80 and 160° C., particularly preferably between 120 and 150° C. Curing times are, for example, of the order of 20 to 40 minutes. The thickness of the stoved film is, for example, approx. 15 to 50 μm. The resultant lacquer coating is crosslinked, hard and glossy. A preferred embodiment is application of the coating composition according to the invention as a clear lacquer coating on a base lacquer. In this case, the wet-on-wet method is preferably used or the base lacquer is previously dried by heating. Particularly good adhesion between the two layers is achieved.

The coating compositions according to the invention formulated as clear lacquers may be used to overcoat, for example, base lacquers which may contain conventional topcoat lacquer pigments, the base lacquers preferably containing effect pigments, such as for example metallic pigments. The base lacquer binder is preferably based on polyester, polyurethane or acrylate resins. These binders may optionally be crosslinked by means of crosslinking agents, for example melamine or isocyanate derivatives.

The coating compositions according to the invention are in particular suitable for topcoat lacquers or clear lacquers which are preferably used in the automotive sector, but also in other sectors. Use of the coating composition according to the invention in multi-layer lacquer coating is particularly suitable for automotive original lacquer coating.

The coating compositions according to the invention are particularly suitable for the production of a transparent topcoat on a stoved multi-layer coating. They are in particular suitable for providing the original lacquer coating on automotive bodywork and components.

EXAMPLE 1

308 g of an aromatic hydrocarbon having a boiling range from 153° C. to 180° C. and 22 g of n-butanol are introduced into a 2 liter, three-necked flask with ground joints which is equipped with a stirrer, contact thermometer, bulb condenser and dropping funnel, and heated to 146° C. while being stirred and refluxed. A mixture prepared from 14 g of acrylic acid, 177 g of 2-ethylhexyl methacrylate, 128 g of 2-hydroxyethyl methacrylate, 220 g of styrene and 11 g of di-tert.-butyl peroxide is apportioned within 5 hours. The reaction mixture is then post-polymerised for 5 hours at 146° C., cooled to 100° C. and diluted with 97 g of an aromatic hydrocarbon having a boiling range from 153° C. to 180° C. and 23 g of n-butanol. The polymer solution had a solids content of 55.3%, an acid value of 20.4 mg of KOH/g, an OH value of 102 mg of KOH/g and a viscosity of 1950 mPa·s/25° C.

EXAMPLE 2

200 g of an aromatic hydrocarbon having a boiling range from 153° C. to 180° C. and 20 g of n-butyl acetate are introduced into a 2 liter, three-necked flask with ground joints which is equipped with a stirrer, contact thermometer, bulb condenser and dropping funnel, and heated to 148° C. while being stirred and refluxed. A mixture prepared from 5 g of acrylic acid, 148 g of isobutyl acrylate, 190 g of 2-ethylhexyl methacrylate, 267 g of 2-hydroxypropyl methacrylate, 10 g of di-tert.-butyl peroxide and 30 g of tert.-butyl peroctanoate is apportioned continuously within 6 hours. The reaction mixture is then post-polymerised for 6 hours at 145° C., cooled to 100° C. and diluted with 50 g of an aromatic hydrocarbon having a boiling range from 153° C. to 180° C. and 80 g of n-butyl acetate. The polymer solution had a solids content of 65.1%, an acid value of 10.9 mg of KOH/g, an OH value of 160 mg KOH/g and a viscosity of 546 mPa·s/25° C.

EXAMPLE 3

A one-component clear lacquer was produced by homogeneously mixing together 29.0 parts of the resin solution from Example 1 with 24.4 parts of the resin solution from Example 2, 15.5 parts of a 65% solution of an isophorone diisocyanate isocyanurate capped with malonic acid diethyl ester, 15.5 parts of 58% solution of a butanol-etherified melamine resin, 0.6 parts of a benzotriazole type light stabiliser, 0.7 parts of a HALS type light stabiliser, 0.7 parts of a 10% silicone oil solution, 4 parts of n-butanol and 9.6 parts of an aromatic hydrocarbon having a boiling range from 153° C. to 180° C.

EXAMPLE 4

A one-component clear lacquer was produced by homogeneously mixing together 27.5 parts of the resin solution from Example 1 with 25.7 parts of the resin solution from Example 2, 15.5 parts of a 65% solution of an isophorone diisocyanate isocyanurate capped with malonic acid diethyl ester, 15.5 parts of 58% solution of a butanol-etherified melamine resin, 0.6 parts of a benzotriazole type light stabiliser, 0.7 parts of a HALS type light stabiliser, 0.7 parts of a 10% silicone oil solution, 4 parts of n-butanol and 9.8 parts of an aromatic hydrocarbon having a boiling range from 153° C. to 180° C.

Bodywork sheet previously coated with conventional commercial cathodic separable electrocoating lacquer (18 μm) and conventional commercial surfacer (35 μm) used in automotive original lacquer coating is lacquer coated to a dry film thickness of 15 μm with a conventional commercial water-borne metallic base lacquer and predried for 6 minutes at 80° C. Immediately thereafter, the clear lacquer from Example 3, 4 or a Comparative Example (Example 2 from EP-A-0 653 468) is applied wet-on-wet by spraying to a dry film thickness of 35 μm and, after 5 minutes' flashing off at room temperature, stoved for 20 minutes at 140° C. (object temperature).

The results obtained are shown in table 1. Testing was performed in accordance with general industry standards. The sulphuric acid resistance of the clear lacquers was tested using the droplet test with 10% sulphuric acid. The test sheets were placed on a hot plate and heated to 60° C. Care must be taken here to lay the sheets flat to ensure optimum heat transfer. At the end of the heating phase, i.e. at 60° C., one droplet is applied onto the clear lacquer surface each minute. Total time is 30 minutes. On completion of the test period, the lacquer coating is washed with water. A brush may, if necessary, also be used for cleaning.

Sulphuric acid resistance is evaluated by stating the period of exposure in minutes at which the first visible film change (swelling), damage (loss of gloss) and base lacquer attack occurred.

TABLE 1

| Example: | Examples according to the invention | | Comparison 2 from EP-A- 0 653 468 |
|---|---|---|---|
| | 3 | 4 | |
| Gloss, 20°: (DIN 67530) | 93 | 92 | 88 |
| Pendulum hardness: (oscillations) | 124 | 129 | 77 |
| Sulphuric acid test, 10% H$_2$SO$_4$, 30', 60° C. | | | |
| Swelling | 18 | 19 | 17 |
| Loss of gloss | >30 | >30 | 22 |
| Basecoat attack | >30 | >30 | 30 |
| Condensing moisture cabinet (DIN 50017) n. 240 h: | OK | OK | Loss of gloss |

We claim:
1. Coating compositions containing as binder:
   A) 20 to 40 wt. % of one or more hydroxy-functional methacrylate copolymers obtained from:
      a1) 30 to 50 wt. % of styrene and/or one or more styrene derivatives;
      a2) 15 to 30 wt. % of hydroxyethyl, hydroxypropyl and/or hydroxybutyl methacrylate;
      a3) 15 to 40 wt. % of one or more non-functionalised (cyclo)alkyl methacrylates having 8 to less than 18 C atoms in the (cyclo)alkyl residue;
      a4) 2 to 4 wt. % of acrylic acid; and
      a5) 0 to 30 wt. % of one or more non-functionalised (cyclo)alkyl methacrylates having tip to 7 C atoms in the (cyclo)alkyl residue,
   B) 20 to 40 wt. % of one or more hydroxy-functional methacrylic copolymers obtained from:
      b1) 25 to 50 wt. % of hydroxyethyl, hydroxypropyl and/or hydroxybutyl methacrylate;
      b2) 20 to 40 wt. % of one or more non-functionalised (cyclo)alkyl methacrylates having 8 to less than 18 C atoms in the (cyclo)alkyl residue;
      b3) 20 to 40 wt. % of one or more non-functionalised (cyclo)alkyl methacrylates having up to 7 C atoms in the (cyclo)alkyl residue; and
      b4) 0.3 to 2 wt. % of (meth)acrylic acid,
   C) 0 to 40 wt. % of one or more hydroxy-functional binders other than A) and B),
   D) 10 to 50 wt. % of one or more free or blocked polyisocyanates, and
   E) 0 to 40 wt. % of one or more triazine-based components which crosslink with the hydroxyl groups of components A), B) and optionally C) to form ether and/or ester groups,
wherein the sums of components A) to E), a1) to a5) and b1) to b4) in each case amount to 100 wt. %.

2. Coating composition according to claim 1, in which component A) has a weight average molecular weight (Mw) of 5000 to 20000 and component B) has a weight average molecular weight (Mw) of 2000 to 5000.

3. Coating composition according to claim 1, in which component A) has a glass transition temperature in the range from +30° C. to +60° C. and component B) has a glass transition temperature in the range from −20° C. to +40° C.

4. Coating composition according to one of claim 1, in which component A) has an OH value of 80 to 120 mg of KOH/g and component B) has an OH value of 120 to 180 mg of KOH/g.

5. Coating composition according to claim 1, in which component A) has an acid value of 15 to 30 mg of KOH/g and component B) has an acid value of 3 to 15 mg of KOH/g.

6. Coating composition according to claim 5, in which the carboxyl groups determining the acid value of components A) and/or B) are at least partially neutralised and the coating composition is in aqueous form.

7. Coating composition according to one claim 1 formulated without pigments as a clear lacquer.

8. Process for multi-layer lacquer coating of substrates by applying a pigmented base lacquer layer onto an optionally precoated substrate and overcoating the base lacquer layer with a clear lacquer layer, comprising:

applying a coating composition according to claim 1 to produce the base lacquer layer and/or the clear lacquer layer.

9. Process according to claim 8, comprising:

forming the clear lacquer layer from a coating composition according to claim 7, applying said layer wet-on-wet onto an aqueous or solvent-borne base lacquer layer, and stoving the two layers together.

10. A process comprising applying the coating compositions according to claim 7 as clear lacquers or topcoat lacquers, for multi-layer lacquer coating of automotive bodywork or components thereof.

* * * * *

UNITED STATES PATENT AND TRADEMARK OFFICE
CERTIFICATE OF CORRECTION

PATENT NO. : 6,013,326
DATED : January 11, 2000
INVENTOR(S) : FLOSBACH et al.

It is certified that error appears in the above-identified patent and that said Letters Patent is hereby corrected as shown below:

Column 3, line 17, change "mm" to --mg--.

Column 4, line 22, change "9)" to --B)--.

Signed and Sealed this

Ninth Day of January, 2001

Attest:

Q. TODD DICKINSON

*Attesting Officer*  *Commissioner of Patents and Trademarks*